United States Patent
Roth

[11] Patent Number: 5,113,258
[45] Date of Patent: May 12, 1992

[54] COMPENSATION CIRCUIT FOR THE CORRECTION OF IMAGE DEFECTS OF A TELEVISION IMAGE

[75] Inventor: Philippe Roth, Dänikon, Switzerland

[73] Assignee: Gretag Aktiengesellschaft, Regensdorf, Switzerland

[21] Appl. No.: 506,080

[22] Filed: Apr. 9, 1990

[30] Foreign Application Priority Data

Apr. 10, 1989 [CH] Switzerland .................. 1352/89

[51] Int. Cl.$^5$ ................ H04N 5/213; H04N 5/235
[52] U.S. Cl. ................................. 358/167; 358/168; 358/169
[58] Field of Search ............ 358/336, 374, 340, 328, 358/166, 167, 36, 168, 169, 163, 233, 62

[56] References Cited

U.S. PATENT DOCUMENTS

| | | | |
|---|---|---|---|
| 3,582,185 | 6/1971 | Steiger | 358/233 |
| 3,774,233 | 11/1973 | Dueringer | 358/233 |
| 4,721,881 | 1/1988 | Towlson | 358/233 |
| 4,748,499 | 5/1988 | Ueda | 358/36 |
| 4,802,010 | 1/1989 | Skinner et al. | 358/169 |
| 4,807,040 | 2/1989 | Kondo et al. | 358/233 |
| 4,837,624 | 6/1989 | Heitmann et al. | 358/163 |
| 4,839,726 | 6/1989 | Balopole et al. | 358/169 |
| 4,843,472 | 6/1989 | Shinada | 358/168 |
| 4,888,642 | 12/1989 | Kato | 358/36 |
| 4,930,005 | 5/1990 | Yamada et al. | 358/36 |
| 4,991,026 | 2/1991 | Takase et al. | 358/328 |
| 4,994,920 | 2/1991 | Fujiwara et al. | 358/166 |

FOREIGN PATENT DOCUMENTS 0073377 3/1989 Japan .................. 358/168

OTHER PUBLICATIONS

William Good; "Recent Advances in . . . TV Light-Valve Projector"; Mar. '75; p. 96, Introduction Section, p. 97, Why an Oil Film? Section.

Kays, "Grossbildprojektion fur professionelle Anwendungen", Fernseh abd Kino Technik, vol. 41, No. 4, Apr. 1987, pp. 125-130.

Teichner, "Three-Dimensional pre- and post-filtering for PAL TV Signals", IEEE Transactions on Consumer Electronics, vol. 34, No. 1, Feb. 1988, pp. 205-207, European Search Report.

Primary Examiner—James J. Groody
Assistant Examiner—Jeffrey S. Murrell
Attorney, Agent, or Firm—Burns, Doane, Swecker & Mathis

[57] ABSTRACT

In a compensation circuit for the correction of image defects of an image projection system according to the control layer principle, in particular of an eidophor projector, a compensation signal is produced from signals associated with three adjacent lines, using an adder followed by a coefficient multiplier in order to produce a compensation signal. The amplitude of the compensation signal assumes a maximum value for low values of an intermediate image point in a single column image matrix of a video signal and a minimum value for high levels of the intermediate image point.

10 Claims, 1 Drawing Sheet

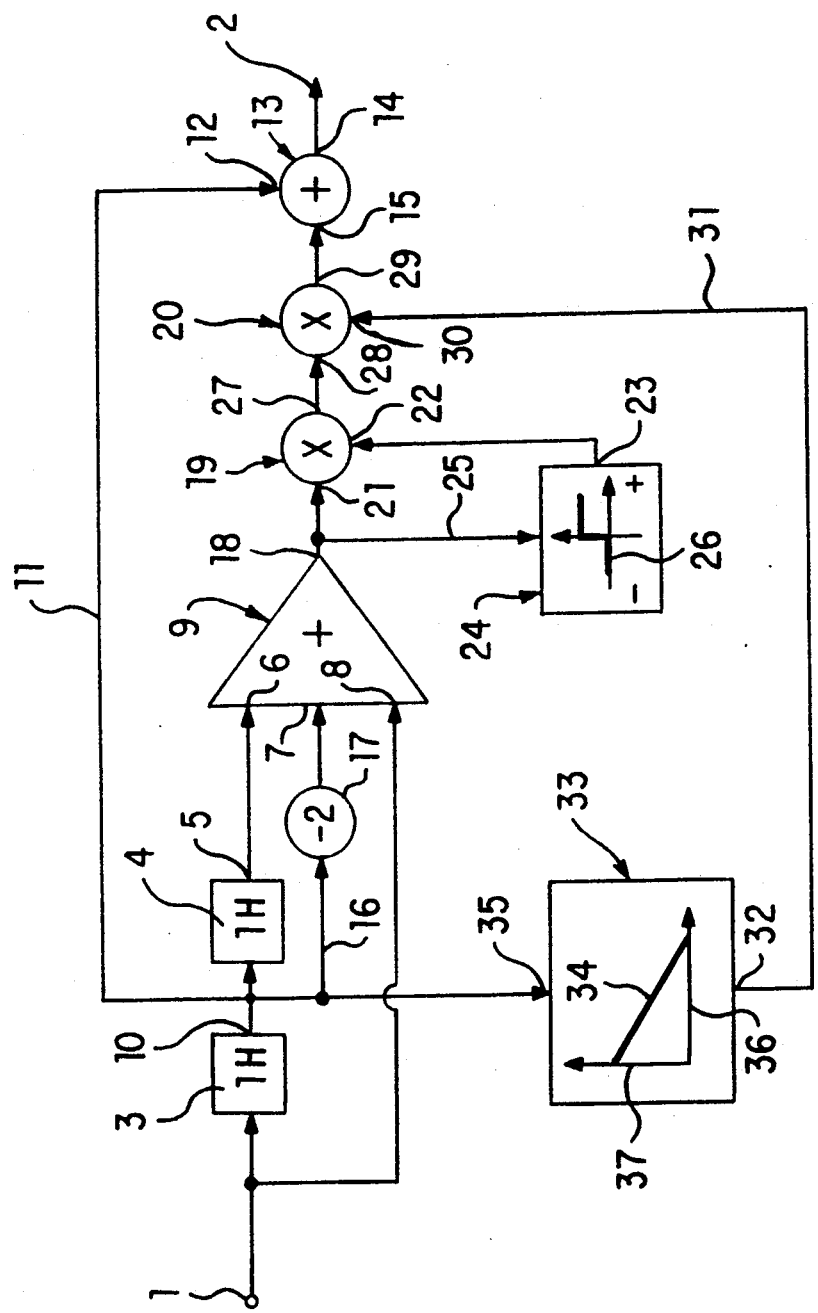

COMPENSATION CIRCUIT FOR THE CORRECTION OF IMAGE DEFECTS OF A TELEVISION IMAGE

BACKGROUND OF THE INVENTION

The invention relates to a compensation circuit for the correction of image defects of a television image, in particular an eidophor image projection system, wherein an electron beam controls the luminous flux of a strong source of light via a schlieren optics. In such a compensation circuit, two line memories, at least one coefficient multiplier, a first adder to generate a compensation signal of three consecutive lines and a second adder for the addition of the compensation signal to the image signal of the intermediate line of three adjacent lines, are provided for the video signal of every displayable color extract or black/white image.

A compensation circuit of this type is described in EP-A1-258 883 and is used to suppress defects in the image projected. The defects are caused by a storage or edge pile-up when, between two adjacent lines of the projection image, a transition from dark lines or line segments to bright lines or bright line segments is taking place. Particularly in a high definition television system, the excess brightness occurring at line packet edges due to the deformation of the control layer in the form of an oil film is disturbing. To eliminate disturbances at horizontal edges, vertical filtering is effected in the known compensation circuit, whereby the stepped edge of the input signal of the vertical filter is converted into a gradual transition. This, however, leads not only to the suppression of the occurrence of bright disturbance effects at horizontal edges by filtering in the vertical direction, but also to a smearing of the horizontal edge in the vertical direction because of the variation of space frequencies. The resulting loss of resolution is especially disturbing in a high definition television system.

In the known compensation circuit the first adder has three inlets for the feeding in of the video signals of three adjacent lines. The video signals are fed in via coefficient multipliers, which multiply the highest and the lowest of the three signals by a constant factor of 0.25. The video signal of the intermediate line is multiplied by a constant factor and an associated coefficient multiplier. The coefficient multiplier causes the constant factor of the intermediate line to correspond to twice the negative value of the compensation factor used for the lowest and highest lines.

It is therefore an object of the present invention to provide a compensation circuit with improved vertical resolution so that finer periodic vertical structures may also be displayed as a gray area, without the defect of overshooting or differentiation, or smearing.

SUMMARY OF THE INVENTION

This object is attained according to the invention by associating at least one switching circuit with the first adder, whereby the brightness level of the prevailing image point in the intermediate line and/or the difference between the brightness of the prevailing image point and vertically adjacent image points may be taken into consideration in the production of the compensation signal.

Compensation factors variably adapted to the image content are used in the production of the compensation signal in place of constant compensation factors determined by the circuit. It is therefore possible to adjust the compensation factor in a manner such that for brighter image points a lower compensation and thus a lesser reduction of the image brightness level is effected relative to the increase of the image brightness level in the case of image points that are darker relative to the environment. In the process, undesirable brightness excesses in the projection image are suppressed, without having to accept high losses in vertical resolution. In the compensation circuit, the image brightness level is reduced in the case of darker vertical neighbors, this reduction being less than the increase in an image brightness level relative to brighter neighbors, with the same absolute level difference. Furthermore, the correction of a dark point in case of the same level difference relative to the neighbors is larger than the correction of a point of medium brightness. In the case of the correction of an image point with two neighbors of identical level differences, the correction is less than twice the correction with only one neighbor with the same level difference. A level difference in existence prior to the correction between two points does not become zero even following the correction of both points by the compensation circuit according to the invention.

The compensation circuit may be optionally structured so that the correction is selectively dependent only on the image brightness level or on the difference of the image brightness levels of vertical adjacent image points. It is further possible to combine the two compensations.

In an exemplary embodiment of the invention, the switching circuit associated with the first adder is provided with a coefficient multiplier inserted into a connection between the outlet of the first adder and the compensation inlet of the second adder, whereby the outlet signal of the first adder may be multiplied as a function of the brightness level of the prevailing image point on the intermediate line by a compensation factor. Structural elements may be saved by locating the coefficient multiplier in the output circuit and not in the input circuit of the first adder.

A level evaluation switching circuit is associated with the coefficient multiplier to which the video signal of the intermediate line is fed, and produces as the output signal a compensation factor signal according to a given characteristic line, with the value of the signal declining if the image brightness level is increasing. The characteristic line of the level evaluation switching circuit may decline linearly between 0.5 and 0, or it may have the configuration of any other declining nonlinear function.

According to one embodiment of the invention, the second adder will receive the compensation signal only if it has a positive value. For this purpose, in the output circuit of the first adder, an electronically controllable switch may be provided which is open in the case of negative output signals of the first adder.

A sign testing switching circuit is used to control the switch and is supplied the output signal of the first adder.

The switch at the outlet of the first adder may be in the form of a multiplier, which on the one hand receives the output signal of the first adder and on the other hand, receives the output signal of the sign testing switching circuit, with the output signal of the sign testing switching circuit providing either the value of 0 or 1 as the input factor.

According to a variant of the present invention, the sign testing switching circuit may be laid out in a manner such that it does not jump from 0 to 1 in a transition from negative values to positive values, but delivers input factors for the multiplier gradually varying from values near 0 to values near 1.

BRIEF DESCRIPTION OF THE DRAWINGS

Other objects and advantages will become apparent from the following detailed description of preferred embodiments of the invention as described in conjunction with the accompanying drawing wherein a block circuit diagram of a compensation circuit according to an exemplary embodiment of the present invention is shown.

DETAILED DESCRIPTION OF PREFERRED EMBODIMENTS

The compensation circuit shown in the drawing comprises an inlet 1 to which the video signal associated with a black/white image or the video signal associated with a color extract for one of three colors of a color image is applied. The compensation circuit represents a special filter that may consist of analog or digital structural elements. Correspondingly, the individual components of the compensation circuit are analog switching circuits or digital switching circuits and the video signal is an analog or a digitalized video signal. The filtered analog or digital video signal is applied to the outlet 2 of the compensation circuit where it is subsequently fed into the appropriate channel of the image projection apparatus.

The inlet 1 is connected with a first line memory 3. The line memory 3 makes it possible to store a line of a television image in between. The first line memory 3 is followed by a second line memory 4. An image brightness level for an image point is applied to the outlet 5, the image point being displaced by two lines vertically in the television image relative to the image point whose image brightness level is applied at this instant to the inlet 1. The first line memory 3 and the second line memory 4 thus make possible the parallel application of the video signals of three adjacent lines to the inlets 6, 7, and 8 of a first adder 9.

The video signal of an intermediate line of three lines is always standing at the outlet 10 of the first line memory 3, the three lines being applied to the inlets 6, 7 and 8 of the first adder 9. The video signal of the intermediate line is additionally conducted by a line 11 to the image signal inlet 12 of a second adder 13. The compensated video signal is taken off the outlet 14 of the second adder, the compensated video signal being produced by the addition of the video signal on the line 11 and the compensation signal fed into a compensation inlet 15 of the second adder 13.

The outlet 10 of the first line memory 3 is connected by a line 16 and a constant coefficient multiplier with the center (in the drawing) inlet 7 of the adder 9. The constant coefficient multiplier 17 multiplies the values of the video signals of the intermediate of the three lines coming in on the line 16 by a factor of −2.

The video signal standing at the inlet 1 for the lowest of the three lines processed simultaneously is applied directly to the inlet 8 (which is lowest in the drawing) of the first adder 9. The video signal of the uppermost line standing at the outlet 5 is applied directly to the uppermost inlet 6 of the first adder 9. Thus, the first adder always forms the sum of the image brightness level of the uppermost and lowest image point of a single column image matrix extending vertically over three lines, while twice the value of the image brightness value of the intermediate image point is deducted.

The first adder 9 provides at its outlet 18 a signal that is further processed by a multiplier 19 and a coefficient multiplier 20, in order to produce the compensation signal to be passed on to the compensation inlet 15.

The multiplier 19, which in a modified compensation circuit may be replaced by a direct bridge or an electronically actuated in/out switch, is connected by its first inlet 21 with the outlet 18 of the first adder 9. The second inlet 22 of the multiplier 19 is exposed to an input factor signal which appears at the outlet 23 of a sign testing circuit 24 and, in an exemplary embodiment, has the value of 0 or 1. Multiplication by the value of 0 corresponds to the opening of a switch and multiplication by the value of 1 to the closing of a switch. If, in place of the multiplier 19, an electronic switch is provided, the latter may also be controlled directly by the binary inlet factor signal.

The sign tester switching circuit 24 is exposed to the output signal of the first adder 9 by an inlet line 25 and determines whether the sum of the image brightness of the image points of the image matrix of the uppermost and the lowest line is larger or smaller than twice the image brigtness level of the image point in the intermediate line of the same column. If the output signal of the adder 9 is negative, the outlet 23 issues the signal 0, whereby the production of a compensation signal is suppressed. In this manner a control is obtained as a function of the level differences between the image brightnesses of three points located above each other in an image column. To visualize the function of the sign switching circuit 24, the characteristic line 26 is drawn as a step function in the block representing the sign testing circuit 24. In a deviation from the step function shown for the determination of the coupler function, a function other than the step function may be provided as the characteristic line, the line yielding values in the vicinity of 0 at the outlet 23 for the negative range, and yielding values in the vicinity of 1 at the outlet 23 for the positive range, with the transition being flat and not stepped.

The outlet 27 of the multiplier 19 is connected with the signal inlet 28 of the coefficient multiplier 20, the outlet 29 of which produces a signal applied to the compensation inlet 15 of the second adder 13. The coefficient multiplier 20 makes possible the weighting and adaptation of the amplitude of the compensation signal by a compensation factor signal fed into the factor inlet 30, the factor having values between 0 and 0.5. In the case of values in the vicinity of 0, compensation is slight, while with values near 0.5, a strong compensation of the video signal fed in at the inlet 1 and put out at the outlet 2 is effected.

The factor inlet 30 is connected by a line 31 with the outlet 32 of a level evaluation switching circuit 33, which has the characteristic line 34 shown in the block of the level evaluation circuit 33. The inlet 35 of the level evaluation circuit 33 is connected with the outlet 10 of the first line memory 3 and therefore always receives the image brigtness level signals of an image point on the intermediate line of three adjacent lines taken into account in the production of the compensation signal.

As seen from the characteristic line 34, the level evaluation circuit 33 produces a small compensation factor signal plotted on the ordinate 37 for a high image brightness signal level plotted on the abscissa 36. The characteristic line 34 further shows that the compensation factor signal is large for low image signal levels and minimal in the case of high image signal levels.

This results in a nonlinear correction of the video signal, whereby it is not necessary to pay for the compensation of excess brightness due to the physical properties of the control layer of the projection system with an appreciable loss of vertical resolution.

In place of the straight characteristic line shown in the block of the level evaluation switching circuit 34, other functions, such as in particular quadratic functions or logarithmic functions, may be used. In the case of an exemplary simplified embodiment of the present invention, it is further possible to eliminate the level evaluation circuit 33 entirely and to adjust the compensation signal merely by using the multiplier 19 without a coefficient multiplier 20.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A compensation circuit for correcting image defects of a television image, comprising:
    means for receiving a video signal;
    two line memories for storing lines of the video signal;
    at least one coefficient multiplier for multiplying values of the video signal lines;
    a first adder for generating a compensation signal of three consecutive lines of the video signal;
    a second adder for adding the compensation signal to an intermediate line of said three consecutive lines of the video signal; and
    at least one electronic circuit interconnecting said first adder with said second adder, and for further processing said compensation signal to take into account a brightness level of a prevailing image point in the intermediate line of the video signal and/or a difference between the brightness level of the prevailing image point and of vertically adjacent image points of the video signal.

2. Compensation circuit according to claim 1, wherein the associated electronic circuit further comprises: a coefficient multiplier inserted between an outlet of the first adder and a compensation inlet of the second adder, output signal of the first adder being multiplied by a compensation factor as a function of the brightness level of the prevailing image point on the intermediate line.

3. Compensation circuit according to claim 2, further comprising: a level evaluation switching circuit fed by the brightness level of a prevailing image point in the intermediate line such that a compensation factor signal is produced which declines with increasing brightness levels of the prevailing image point of the intermediate line.

4. Compensation circuit according to claim 3, wherein the compensation factor signal has values between 0 and 0.5.

5. Compensation circuit according to claim 3, wherein the associated electronic circuit further comprises: a switch connected with the outlet of the first adder and actuated by a sign testing circuit fed by the output signal of the first adder, said sign testing circuit causing said switch to close in response to a positive output signal from said first adder and causing said switch to open in response to a negative output signal from said first adder in order to suppress production of a compensation signal.

6. Compensation circuit according to claim 5, wherein the switch is a multiplier and an output signal of the sign testing circuit has values of 0 or 1 as a function of the sign of the detected first adder output signal.

7. Compensation circuit according to claim 5, wherein the switch is a multiplier and an output signal of the sign testing circuit has values in the vicinity of 0 for negative values of the output signal of the first adder and has positive values increasing to near 1 for positive values of the output signal of the first adder.

8. Compensation circuit according to claim 1, wherein said two line memories, said at least one coefficient multiplier, said first adder and said second adder are provided for a video signal of every displayable color extract.

9. Compensation circuit according to claim 1, wherein said image defects are corrected for a television image of an image projection system using a control layer principal.

10. Compensation circuit according to claim 1, wherein said two line memories, said at least one coefficient multiplier, said first adder and said second adder are provided for a video signal of a black/white image.

* * * * *